Aug. 13, 1968     T. HAYES     3,396,990

CHILD'S VEHICLE PROPELLED BY JUMPING MOTION

Filed Oct. 17, 1966

INVENTOR.
THOMAS HAYES

ATTORNEYS

United States Patent Office 3,396,990
Patented Aug. 13, 1968

3,396,990
CHILD'S VEHICLE PROPELLED BY JUMPING MOTION
Thomas Hayes, New York, N.Y., assignor to Kenneth S. Goldfarb, New York, N.Y.
Filed Oct. 17, 1966, Ser. No. 587,156
6 Claims. (Cl. 280—221)

This invention relates to a Pogo scooter, and more particularly to a wheeled vehicle which can be propelled by the up and down jumping motion of a passenger carried thereon.

The invention will be better understood from the following description taken in conjunction with the accompanying drawings, in which.

Figure 2:
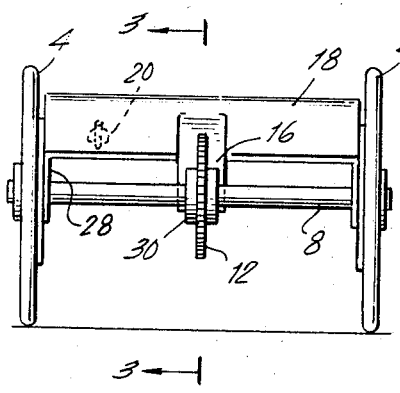
FIG. 2 is a rear elevational view of the device of FIG. 1.
Figure 1:
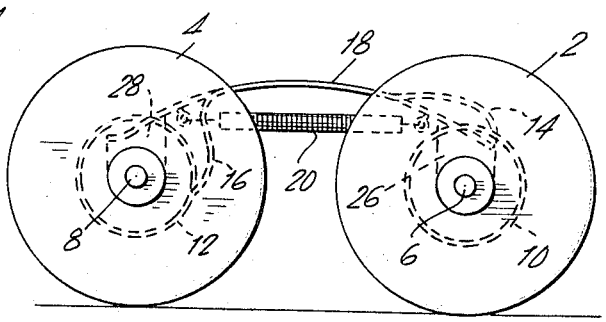
FIG. 1 is a side elevation view of the device according to the invention.
Figure 4:
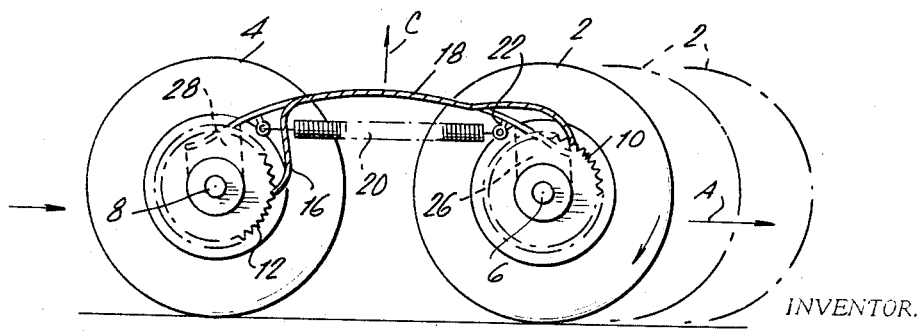
FIG. 4 is a cross sectional view similar to that of FIG. 3, but showing the platform in raised position.

As shown in the figures, the device according to the invention comprises a pair of front wheels 2 and a pair of rear wheels 4. The front wheels are provided with an axle 6 on which they are fixedly mounted, and similarly the rear wheels 4 are provided with an axle 8 on which they are fixedly mounted. Fixed to the center of each of the axles 6 and 8 is a toothed sprocket 10, 12, adapted to be engaged by respective pawl members 14 and 16 at the forward and rearward ends, respectively, of the central platform 18. The pawl 14 turns the sprocket 10 clockwise while the pawl 16 merely acts as a stop member for sprocket 12. A tension coil spring 20, attached to the platform 18 by means of eyes 22 and 24 welded thereto, urges the platform 18 into an upwardly curved shape as shown in FIGS. 1 and 4. The front end of the platform 18 is journalled on the font axle 6 by means of a pair of support bearings 26. Similarly, the rear end of platform 18 is fixedly attached to a pair of support bearings 28, journalled on the axle 8. The pawl members 14 and 16 are preferably struck directly from the same sheet which forms the platform 18, and preferably lie along the center line of the platform 18.

It will be understood that the device according to the invention may be constructed with or without a vertical handle (not shown) straddling the front wheels 2 and attached to the axle 6, with a conventional hand grip, when the device is used as a scooter. Or else, the device may be used as illustrated, with no handle. Alternatively, the rider may be provided with two of such devices, one for each foot, and propel himself as on roller skates, except that the propelling action takes place when he places his weight alternatively on the respective platforms 18 of the devices worn on his left and right feet.

Figure 3:
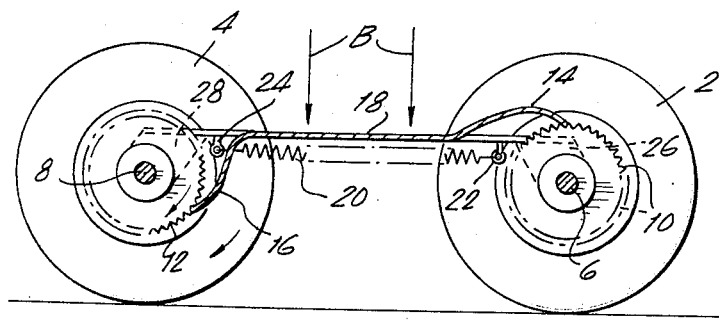
FIG. 3 is a cross section taken along the plane of line 3—3 of FIG. 2, showing the middle platform in lowered position.

Propulsion in a forward direction according to the arrow A of FIG. 4 takes place in the following manner. The weight of the rider on the platform 18 in the direction of arrows B of FIG. 3 forces platform 18 from the curved position of FIGS. 1 and 4 to the flat position of FIG. 3, at the same time placing a tension on the spring 20 while stretching it from its compressed position of FIG. 1 to its extended position of FIG. 3, because of the pulling action of eyes 22 and 24 when the platform 18 is flattened out. Flattening of the platform 18 causes the pawl 14 to rotate the sprocket 10 in a clockwise direction, as viewed in FIGS. 3 and 4; and at the same time the pawl 16 rotates sprocket 12 and wheel 4 by engaging the teeth of the sprocket 12. On the upstroke of the platform 18, forced upwardly in the direction of arrow C of FIG. 4 by means of the spring 20 returning to its compressed condition when the rider's weight is removed from the platform 18, causes the pawl 14 to slip along the teeth of sprocket 10. At the same time, upward action of the platform 18 causes the rear pawl 16 to slip along the teeth of rear sprocket 12 in a counterclockwise direction. Thus, the sprockets 10 and 12 are both rotated clockwise on each downstroke of platform 18. The front wheel 2 will coast along in the travel direction A when the sprocket 10 is not being rotated in a clockwise direction; and similarly, wheel 4 will continue to coast in a clockwise direction during the time that sprocket 12 is not being rotated in a clockwise direction. This can be accomplished by means of a coaster mechanism within the hub 30, known per se, of the type commonly used in bicycles.

It will be obvious to those skilled in the art, upon studying this disclosure, that the devices according to my invention can be modified in various respects and hence may be embodied in apparatus other than as particularly illustrated and described herein without departing from the essential features of my invention and within the scope of the claims annexed hereto.

I claim:

1. A wheeled vehicle comprising front wheel means, rear wheel means, axle means, said wheel means being mounted on said axle means, sprocket means mounted on said axle means for rotating at least one of said wheel means, a flexible platform, biasing means urging said platform into an initial position, and means journalling said axle means to said platform, pawl means depending from said platform for engagement with said sprocket means upon depression of said platform to rotate said sprocket means and said one axle means.

2. A wheeled vehicle according to claim 1, said axle means comprising front and rear axles, said front wheel means comprising a pair of front wheels fixedly mounted on said front axle, said rear wheel means comprising a pair of rear wheels fixedly mounted on said rear axle, said sprocket means including a pair of sprockets operably connected to said front and rear axles.

3. A wheeled vehicle according to claim 2, said biasing means including a spring connected to said platform for urging said platform to an arcuate upwardly concave position.

4. A wheeled vehicle according to claim 1, said pawl means being struck from a common sheet with said platform.

5. A wheeled vehicle according to claim 4, said pawl means lying along the center line of said platform.

6. A wheeled vehicle according to claim 1, said sprocket means including ratchet teeth, said pawl means including a pawl engageable with said ratchet teeth for stopping reverse movement of said sprocket means.

References Cited

UNITED STATES PATENTS

| 903,525 | 11/1908 | Wellnitz | 280—11.11 |
|---|---|---|---|
| 1,127,900 | 2/1915 | Kratky | 280—11.11 |
| 1,574,517 | 2/1926 | Rohdiek | 280—221 |
| 1,991,782 | 2/1935 | Bloomquist | 280—218 |

FOREIGN PATENTS

| 410,664 | 3/1925 | Germany. |
|---|---|---|

KENNETH H. BETTS, *Primary Examiner.*